United States Patent Office 2,739,152
Patented Mar. 20, 1956

2,739,152

DIALKYLAMINOALKYL ESTERS OF DIARYL-ISONICOTINIC ACIDS

Carl Peter Krimmel, Mundelein, Ill., assignor, by mesne assignments, to G. D. Searle & Co., Skokie, Ill., a corporation of Delaware No Drawing. Application October 23, 1953,
Serial No. 388,058

4 Claims. (Cl. 260—295)

My invention is concerned with a new group of heterocyclic esters and, more particularly, with N-dialkylaminoalkyl esters of diarylisonicotinic acids. The esters of my invention can be represented by the general structural formula

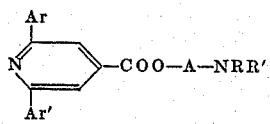

wherein Ar and Ar' are lower aryl radicals, A is a lower alkylene radical and the radical NRR' represents a lower dialkylamino radical or a saturated nitrogen-containing heterocyclic radical attached to the radical A through a nitrogen in the heterocycle.

For the purposes of this invention, the radicals Ar and Ar' represent aryl hydrocarbon radicals, preferably containing 6 to 8 carbon atoms, such as phenyl, tolyl, and xylyl. The radical A represents a bivalent, saturated, aliphatic hydrocarbon radical of from 2 to 8 carbon atoms; this radical is derived from a straight-chain or branched-chain aliphatic hydrocarbon and includes radicals such as ethylene, propylene, butylene, amylene, or polymethylene radicals such as trimethylene, tetramethylene, pentamethylene, and hexamethylene. The radicals R and R' can represent such lower alkyl groups as methyl, ethyl, propyl, butyl, amyl, and hexyl, wherein the propyl, butyl, amyl and hexyl groups can be either of the straight-chain or branch-chain type. In addition the radical NRR' can also be a saturated nitrogen-containing heteromonocyclic group attached to the radical Alk through a nitrogen in the heterocycle; examples of suitable heterocyclic groups are N-pyrrolidino, N-piperidino, N-lupetidino, N-morpholino, N-thiamorpholino, N'-alkyl-N-piperazino and like radicals.

The organic bases of the foregoing type form salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The object of my invention is to provide novel organic esters and their salts. These esters are potent pharmaceutical agents. They have a valuable cardiovascular effect and produce a high degree of vasodilation. They are also active antibiotic and amebacidal agents.

My invention will appear more fully from the following examples which serve to illustrate procedures for synthesizing this new group of esters. However, my invention is not to be construed as limited thereby in spirit or in scope. In these examples temperatures are given uncorrected in degrees centigrade (0 C.) and quantities of materials in parts by weight.

EXAMPLE 1

β-Diethylaminoethyl 2,6-diphenylisonicotinate

To a refluxing solution of 90 parts of 2,6-diphenylisonicotinic acid in 1600 parts of anhydrous isopropanol are added 45 parts of β-chloroethyldiethylamine. The reactants are refluxed for 5 hours and the clear reaction mixture is filtered hot and allowed to cool. This results in the formation of a heavy white precipitate which is suction filtered, washed with anhydrous isopropanol, and dried in a steam cabinet. Recrystallization from anhydrous isopropanol gives white needles melting at about 198–200° C. The β-diethylaminoethyl 2,6-diphenylisonicotinate hydrochloride thus obtained has the structural formula

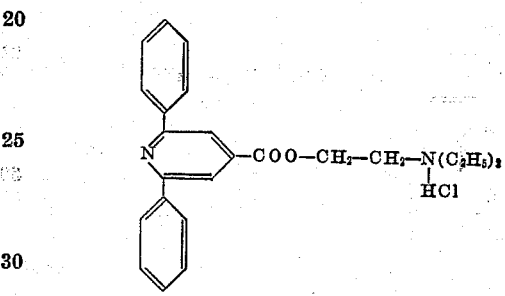

EXAMPLE 2

γ-Di-n-propylaminopropyl 2,6-diphenylisonicotinate

A mixture of 100 parts of 2,6-diphenylisonicotinic acid and 492 parts of thionyl chloride is refluxed on a steam bath for 30 minutes. The excess thionyl chloride is removed under vacuum leaving a pale yellow solid residue which, without further purification, is taken up in 880 parts of hot benzene. To the benzene solution are slowly added 57 parts of 3-di-n-propylamino-1-propanol. A copious white precipitate develops after a short interval of heating. The precipitate is collected on a filter, washed with 440 parts of cold benzene and dried in a steam cabinet. After recrystallization from butanone and activated charcoal, the hydrochloride of γ-di-n-propylaminopropyl 2,6-diphenylisonicotinate is obtained as a white microcrystalline powder melting at about 194–196° C. This salt has the structural formula

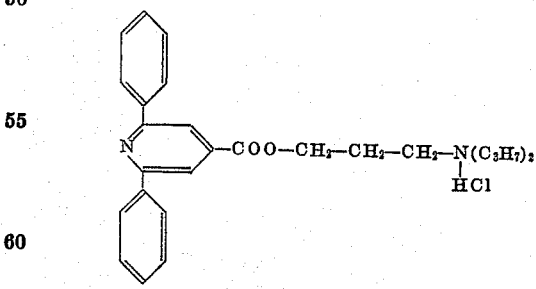

I claim:
1. A compound of the structural formula

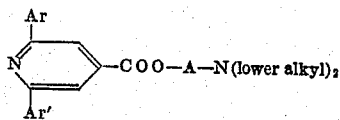

wherein Ar and Ar' are aryl hydrocarbon radicals containing 6 to 8 carbon atoms and A is a lower alkylene radical separating the oxygen and the nitrogen atoms attached thereto by at least two carbon atoms.

2. A compound of the structural formula

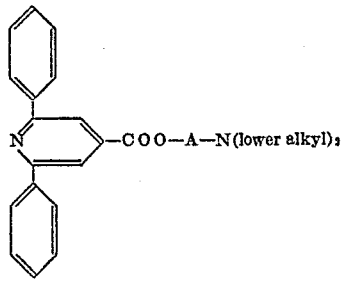

wherein A is a lower alkylene radical separating the oxygen and the nitrogen atoms attached thereto by at least two carbon atoms.

3. A compound of the structural formula

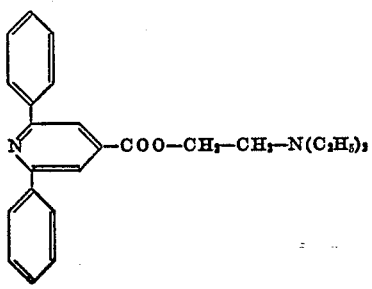

4. A compound of the structural formula

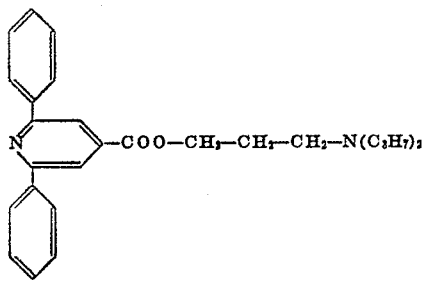

No references cited.